A method of interfacing a client with a job-based print device is disclosed. The method disclosed is a method for processing multiple document jobs of varying complexity and purpose, as they arrive from the network, where a job is a transaction or a set of transactions, involving print data and other input and output from the print device, and a document is a single bounded stream of data, which may be a print job or one assertion in the context of a transaction. The method includes receiving client data before it reaches a print communication protocol module. Any or all of the following capabilities may be demonstrated. Raw page description language data is distinguished from other client data and it is determined if the raw page description language includes a request which requires the attention of a specific interpreter and a temporary realignment of job management. The request is processed. An interface which processes client data is disclosed. The interface includes a query parser that detects a query in the client data and routes the query to be answered. A raw page description language data parser receives non-query client data from the query parser and detects raw data. A font download manager establishes an open channel to a print device bypassing a job management queue if the detected raw data includes a font download. A configuration support manager interfaces with a configuration server to accomplish targeted network configuration changes without affecting other components of the print device controller. The interface also includes a document manager, which parses the incoming data stream, preprocesses data on arrival, gleans job description data, and embeds multiple documents in a single job where appropriate.

14 Claims, 4 Drawing Sheets

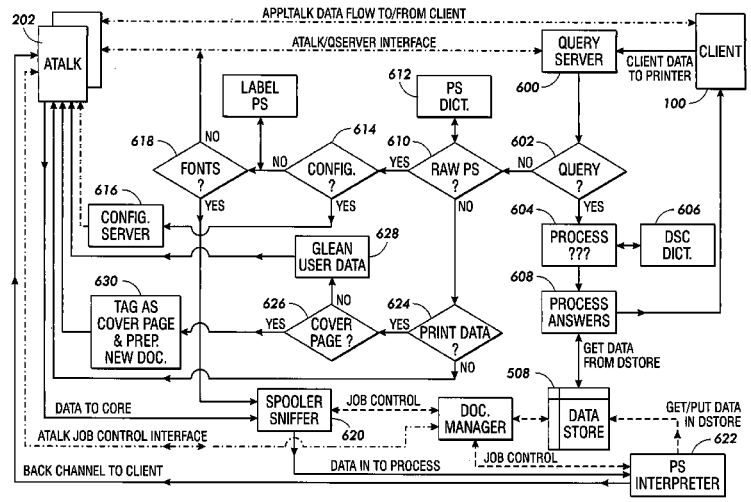

FIG. 1
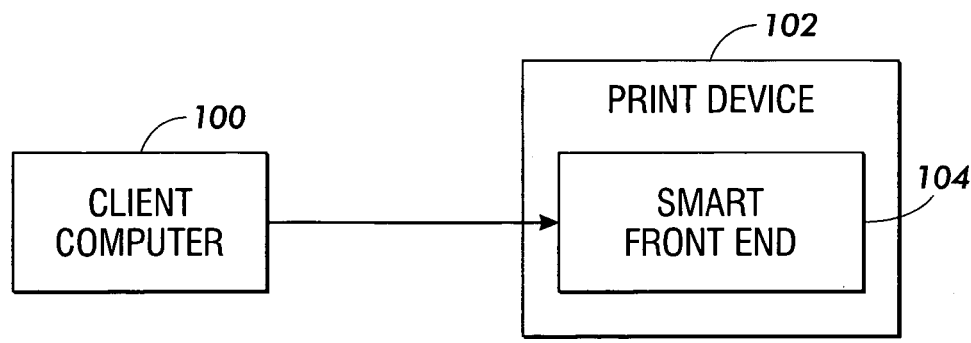
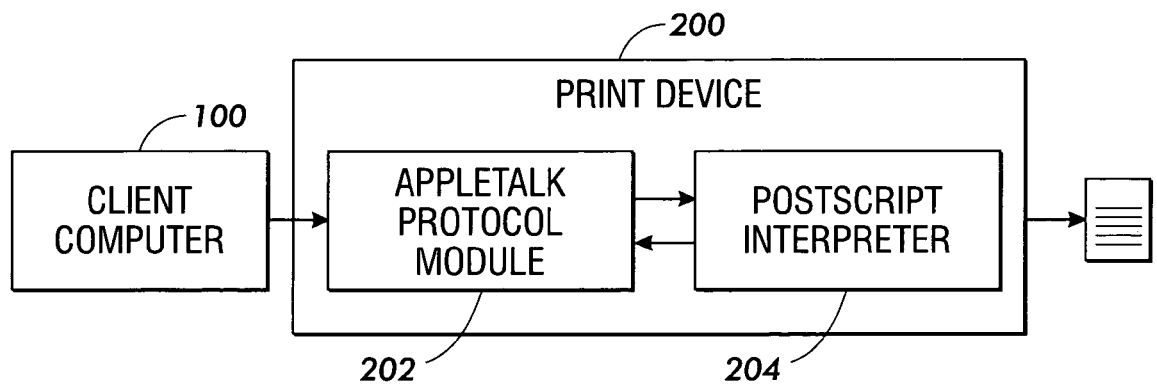
FIG. 2
PRIOR ART

FIG. 3
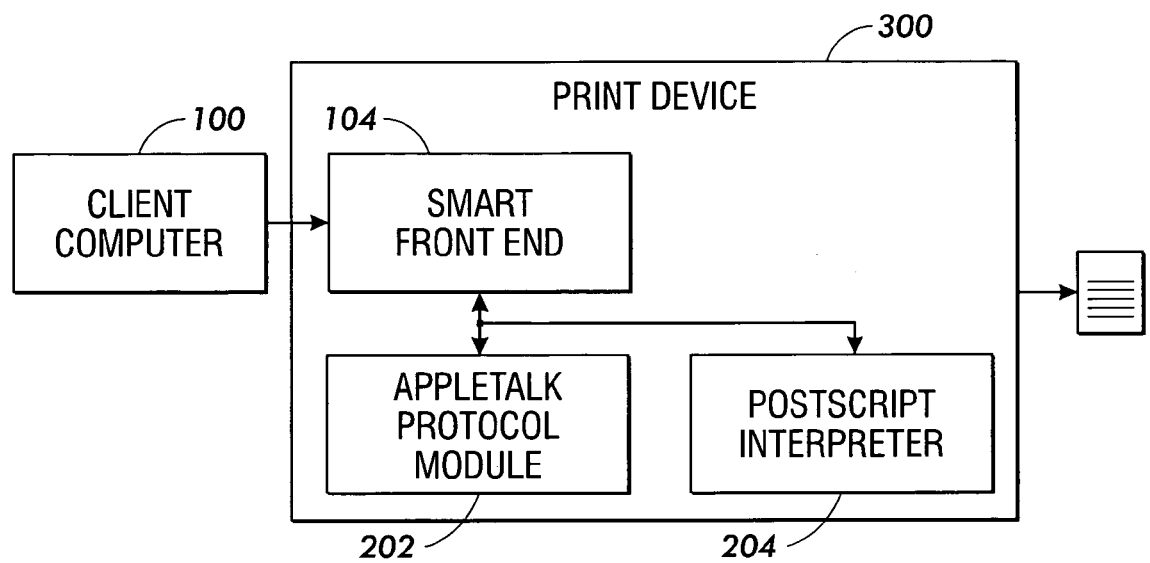
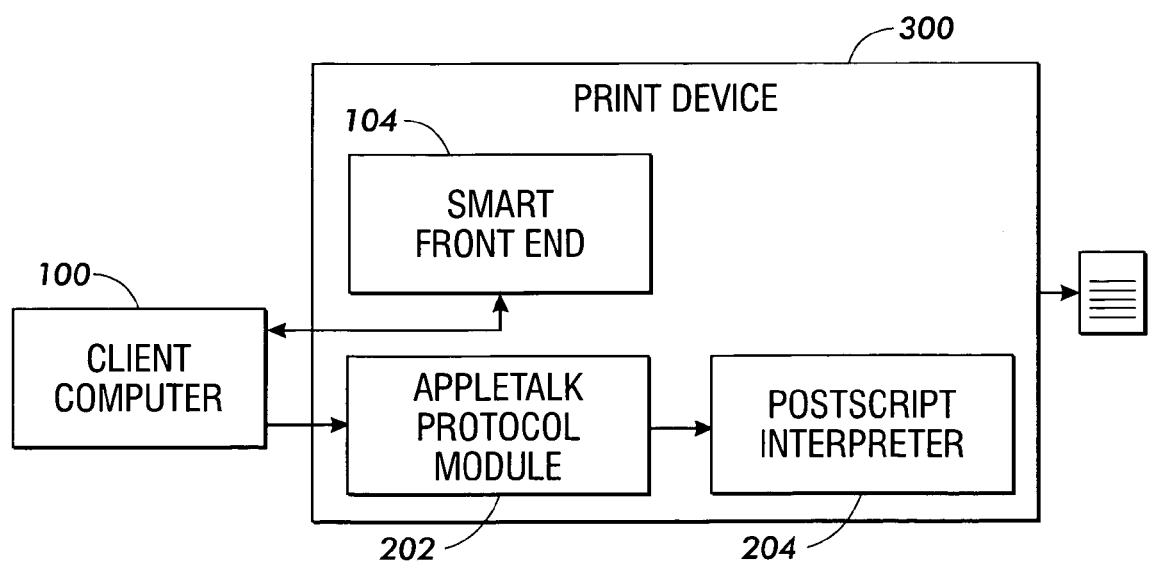
FIG. 4

SMART FRONT END FOR A PRINT COMMUNICATION PROTOCOL

BACKGROUND OF THE INVENTION

1. Field of the Invention

The invention pertains to the art of printing documents from a computer and, more particularly, to a front end software module for improving the use of system resources during printing.

2. Description of Related Art

When a document on the screen of a computer is to be printed, a protocol module such as AppleTalk by Apple Computer is used to facilitate communication between the compute the network and print devices. The data containing the print commands and the information to be printed is sent over the network encoded in a page description language such Postscript from Adobe, Inc. The data is translated at the print device by an Interpreter for the page description language in which it is encoded such as a Postscript Interpreter. The interpreter translates the data received into commands which the printer uses to produce the resulting document.

When a client sends a job to be printed, the AppleTalk protocol sends some initial data to the Postscript interpreter and waits for a response before proceeding to deliver the rest of the print data. When a page printer has been used, the operation has functioned smoothly. A page printer takes in one stream of data, which is parsed one page at a time. As a result, the page printer is able to quickly provide the response required by the AppleTalk protocol.

However, when a job printer is used, significant delays for the computer sending the print job, known as the client, arise. In a job printer, a job manager queues jobs received simultaneously over multiple incoming streams. In this case one or more entire print jobs will be parsed before a response is sent to the AppleTalk Client. When client computers are networked together and there is only one or just a few print devices, multiple data streams are sent to the print device and are queued up for the interpreter. Print jobs often become backlogged and the AppleTalk module for any given client will not promptly receive the required response, causing the client machine to wait for the response. While the client computer is waiting, no other functions can be performed, thus creating significant time periods of inoperation for a computer user.

The present invention contemplates a new apparatus and method for providing a response to the AppleTalk module without the intervention of the Postscript interpreter, resulting in a significant reduction of the response time to the client in a job printing system.

SUMMARY OF THE INVENTION

In accordance with one embodiment of the present invention, a method of interfacing a client with a job-based print device is disclosed. The method includes receiving client data before it reaches a print communication protocol module. Raw page description language data is distinguished from other client data and it is determined if the raw page description language includes a request which requires the attention of a specific interpreter and a temporary realignment of job management. The request is then processed.

In accordance with another embodiment of the present invention, an interface which processes client data is disclosed. The interface includes a query parser that detects a query in the client data and responds to the query directly, prior to routing the job to a print communication protocol module. A raw page description language data parser receives non-query client data from the query parser and detects raw data.

If the detected raw data initiates a font download, an open channel is established to a print device, bypassing job management functions that define the boundaries of the job and a heuristic selector that would normally decide where to route the job (i.e., to one interpreter or another).

If detected raw data initiates a Network configuration change, the change is directly enacted on the protocol module from the smart front end without affecting any other ongoing functions/operations of the print device. Otherwise, this change would have to be initiated and managed from the Interpreter.

If a standard header precedes the data, then it as treated a job document, and if the document is identified as a cover page, the job is enhanced to handle the cover page as a separate document prepended to the job data document.

One advantage of the present invention is that the required response to a print communication protocol is provided without the engagement of the page description language interpreter, reducing the demands placed on the interpreter, thus increasing capability of the interpreter.

Another advantage of the present invention is that the standard job management services that facilitate basic job processing for other protocols are not affected by complex changes needed to process special bi-directional and multi-document jobs.

Yet another advantage of the present invention is that the required response to a print communication protocol module is provided quickly, decreasing the time spent by a client waiting for the response.

Still another advantage of the present invention is that the decreased time spent waiting by the client allows increased operation time of the client by the end user.

Still further advantages of the present invention will become apparent to those of ordinary skill in the art upon reading and understanding the following detailed description of the preferred embodiments.

BRIEF DESCRIPTION OF THE DRAWINGS

The invention may take physical form in certain parts and arrangements of parts, preferred embodiments of which will be described in detail in this specification and merely illustrated in the accompanying drawings which form a part thereof, and wherein:

FIG. 1 is a block diagram illustration of the relationship of the present invention to other components;

FIG. 2 is a block diagram illustration of a print system of the prior art;

FIG. 3 is a block diagram of one portion of a print system using the present invention;

FIG. 4 is a block diagram of another portion of a print system using the present invention;

DETAILED DESCRIPTION OF THE PREFERRED EMBODIMENT

Figure 5:
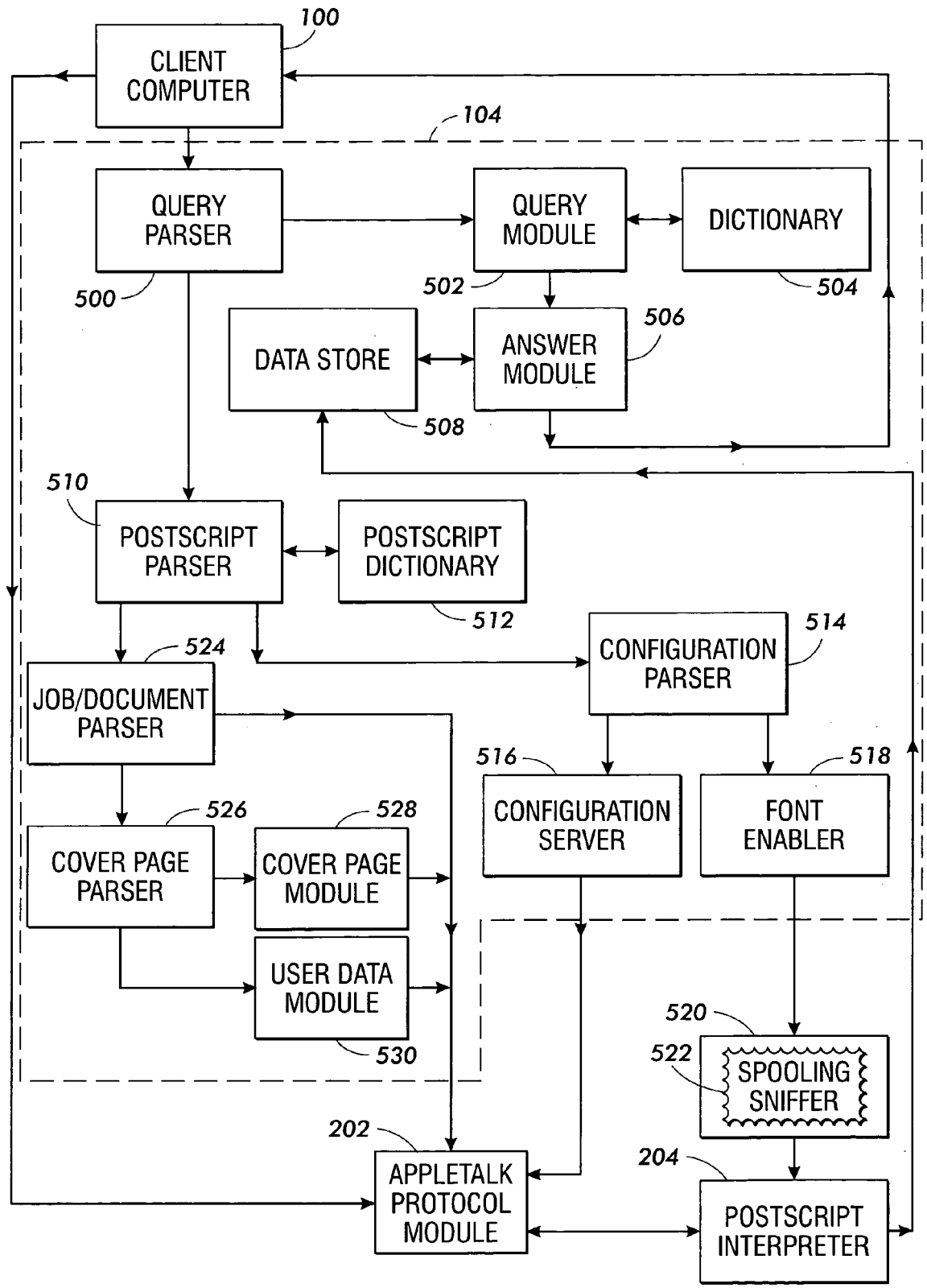
FIG. 5 is a block diagram illustrating one embodiment of the present invention.

Turning now to the drawings, with reference to FIG. 1, a client computer 100 sends print data to be printed. The destination of the print data is a job-based print device 102 such as a printer or copying machine. Before the print data reaches the print device 102 it is received by the interface or smart front end 104 for processing.

Smart front end 104 is integrated on the print device. Such implementation creates certain advantages as a result of being embedded in the print device software, such as: first, real time access to system configuration data; second, the capability to reconfigure the local job management system in a very refined way so as not to interfere with the processing of other jobs coming in on any data stream including ones associated with the same network protocol or any other; and third, the ability to reconfigure a communication protocol module on request.

Nevertheless, because hardware and software configurations may vary, the smart front end 104 may be implemented in the program code for certain software, hardware or a combination thereof used in a system. The result is that the print device 102 receives a print job or other print information from the smart front end 104 formatted according to a defined protocol.

Turning now to FIG. 2, a block diagram illustrates a print system of the prior art including print device 200. Client computer 100 sends a print job. A print communication protocol module 202, such as AppleTalk by Apple Computer, facilitates communication between client 100 and other network and print devices. The AppleTalk module 202 forwards initial print job data and waits for a response from a page description language interpreter, such as a Postscript interpreter 204 from Adobe, Inc. Once the interpreter 204 responds to the AppleTalk module 202, the remaining print data is sent from the AppleTalk module 202 to the Postscript interpreter 204 and the print job is executed. When the print job is executed, client 100 is released to perform further operation. As a result, client 100 must wait for the Postscript interpreter 204 to provide the required response to the AppleTalk module 202 before being able to move on to other tasks.

With continuing reference to FIG. 2, when a page printer is used as the print device, the current system is adequate. A page printer takes in one stream of data and parses it one page at a time, allowing timely functioning of the AppleTalk protocol 202. However, when a job-based print device is used, significant delays for the user of the client computer 100 arise. A job printer is often used when multiple client computers 100 are networked together. On a job printer, one or more entire print jobs are parsed before a response can be sent to the AppleTalk module 202. Once multiple client computers 100 are networked, many computers 100 may send print jobs simultaneously. Because the Postscript interpreter 204 then receives data from multiple clients and parses each job in its entirety, the response to the AppleTalk module 202 may be delayed. This in turn results in significant delays for client 100.

With reference to FIG. 3, a block diagram of a print system, including print device 300 with a smart front end to process print data, font downloads and Windows Operating System AppleTalk Capture requests, is shown. Client computer 100 sends a job that may be any one of these transactions. The AppleTalk protocol module 202 facilitates communication between client 100 and other network and print devices. Before AppleTalk module 202 forwards initial print job data, instead of waiting for a response from the Postscript interpreter 204, the smart front end 105 receives the data, processes the request, and provides configuration support or contextual data to AppleTalk module 202. As a result, there is no delay caused by a back up at the Postscript interpreter 204. The AppleTalk module 202 rapidly and seamlessly processes job configuration and system configuration requests along with client queries, allowing all print data to be received for execution of the print job without interruption. The Interpreter is unencumbered since it is freed from the necessity of managing those requests and waiting on client or internal system responses associated with those requests. Because the required response is provided more quickly, the job is executed in a shorter amount of time, allowing the client 100 to be released sooner and move on to other tasks. Smart front end 104 also allows the print device 300 to handle non standard data coming in without disruption of normal services.

With reference to FIG. 4, a block diagram of a print system including print device 300 with a smart front end to process print queries is shown. Client computer 100 sends a print job to be printed. The AppleTalk protocol module 202 facilitates communication between client 100 and other network and print devices. Before AppleTalk module 202 forwards initial print job data, the smart front end 104 receives the data, interprets any queries within the data and provides the required response to the client 100. The response is sent to the AppleTalk module 202, and, a result, there is no delay caused by a back up at the Postscript interpreter 204. The response is provided quickly, allowing the remaining print data to be sent for execution of the print job. Because the required response is provided more quickly, the job is executed in a shorter amount of time, allowing the client 100 to be released sooner and move on to other tasks. Also, because the response data for the initial request is retrieved from the local system database it is correct for the specific system where the request was made at the time when the request occurred.

With reference to FIG. 5, a block diagram illustrating the smart front end is presented. A client 100 sends a print job, composed of client data, to be printed. Before the data reaches the AppleTalk protocol 202, interface or smart front end 104 receives the data. The smart front end 104 includes a query parser 500, which detects a query in the client data and routes the query to be answered. If a print query is present, query module 502 receives the query in order to interpret it. A dictionary 504 of standard query processing language, such as DSC, is included in the smart front end 104 for access by the query module 502, having an interpretation of the query for the query module 502. An answer module 506 locates the answers to the print queries from the query module 502 and forwards the answer to the client. To retrieve the answer to the print query, answer module 506 accesses a data store 508. The data store 508 has a library of current answers to the print queries, which are updated dynamically by a page description language interpreter, such as a Postscript interpreter from Adobe, Inc. Once answer module 506 has obtained the answer to the query, the answer is sent to the client 100, satisfying the query.

If the client data does not contain a query, the smart front end 104 includes a limited page description language data (Postscript) parser 510 which receives client data without such a query, discriminates some phrases of raw Postscript from a packaged job and processes them. The Postscript parser 510 accesses a page description language (Postscript) dictionary 512, which has portions of Postscript referenced by the parser 510.

With continuing reference to FIG. 5, configuration parser 514 may receive raw Postscript from Postscript parser 510. Configuration parser 514 sorts the raw Postscript to detect network configuration requests. For example, a Capture message may be encountered when a client 100 is an IBM compatible personal computer using AppleTalk as a communication protocol, and software produced by Microsoft Corp. With this combination, a Capture request may be generated which dictates that the network settings for a targeted print device be changed. In the current art, the print device must be taken down, the settings on the print device changed and then the print device must be rebooted, constituting a tremendous inconvenience and effort.

The smart front end 104 responds to and satisfies such a Capture message without the need to take down the print device. Once configuration parser 514 identifies a Capture request, it sends the request configuration server 516. Configuration server 516 takes the (AppleTalk) printer communication protocol for the device off of the network, reconfigures the network settings of that particular communication protocol on the device according to the Capture request and restores the printer communication for the device to the network over that particular communication protocol. Thus, with the smart front end, a reboot of the entire computer network is not necessary. Moreover, there is no effect whatsoever on other printer communication protocols operating on the same device, or on the job processing activity of the device.

If the Postscript data does not contain a configuration request, a font download manager 518 receives the Postscript data from the configuration parser 514. Font enabler 518 identifies and processes Postscript data for a font download. A font download requires a great deal of communication between the AppleTalk protocol module 202 and a Postscript interpreter 204. The Postscript interpreter 204 translates the print data into specific instructions for the print device, a complex step requiring direct feedback from the AppleTalk module 202. As a result, when font download manager 518 identifies a font download, it does not try to respond alone, but rather takes a number of steps to configure the system services to process the font download efficiently. First, the font enabler 518 accesses a spooling module 520 which queues a plurality of client data incoming from all protocol communication modules that may be active on the system, for processing by one or more of the available interpreters 204. Spooling module 520 includes a spooling "sniffer" 522 which monitors the input to the system 204 to determine which interpreter (there may be one or more on the system) 204 is capable of processing a particular document. Once the spooling sniffer 522 decides which interpreter 204 is needed, it marks the job as targeted for a given interpreter, queues it with a job manager, and forwards the print data to the disk. The front end 104 circumvents the sniffer 522, establishes an unrestricted channel between the AppleTalk module 202 and the Postscript interpreter 204 to facilitate direct communication, and opens a back channel for outgoing data between the Postscript interpreter 204 and the client through the AppleTalk communication module 202. Essentially, the Appletalk module 202 is bypassed in the earlier stages of communication so as to allow the construction of a dedicated channel for complex font processing when the interpreter for the print device is available. This channel is closed once the Postscript interpreter 204 and the AppleTalk module 202 have completed the communication necessary to process the font download.

If the client data is not raw Postscript, a job parser 524 receives and sorts the data from the Postscript parser 510. With regard to job parser 524, the term 'job' is a print job which includes documents. If the client data is not recognized, job parser 524 routes the data stream to the AppleTalk protocol module 202. If the data is print data, the job parser 524 routes the data to cover page parser 526. The cover page parser 526 examines the print data and routes any print data that is not cover page data to user data module 530. If the print data is cover page data, cover page parser 526 routes the data to cover page module 528 which modifies job flow to introduce and handle a cover page document. Cover page module 528 tags the print data as a cover page and generates a new document for the actual job before returning the data stream to the user data module 202. If the print data is a standard user document, the user data module 530 gleans any user data to the job structure and returns the data stream to the AppleTalk module 202.

Figure 6:
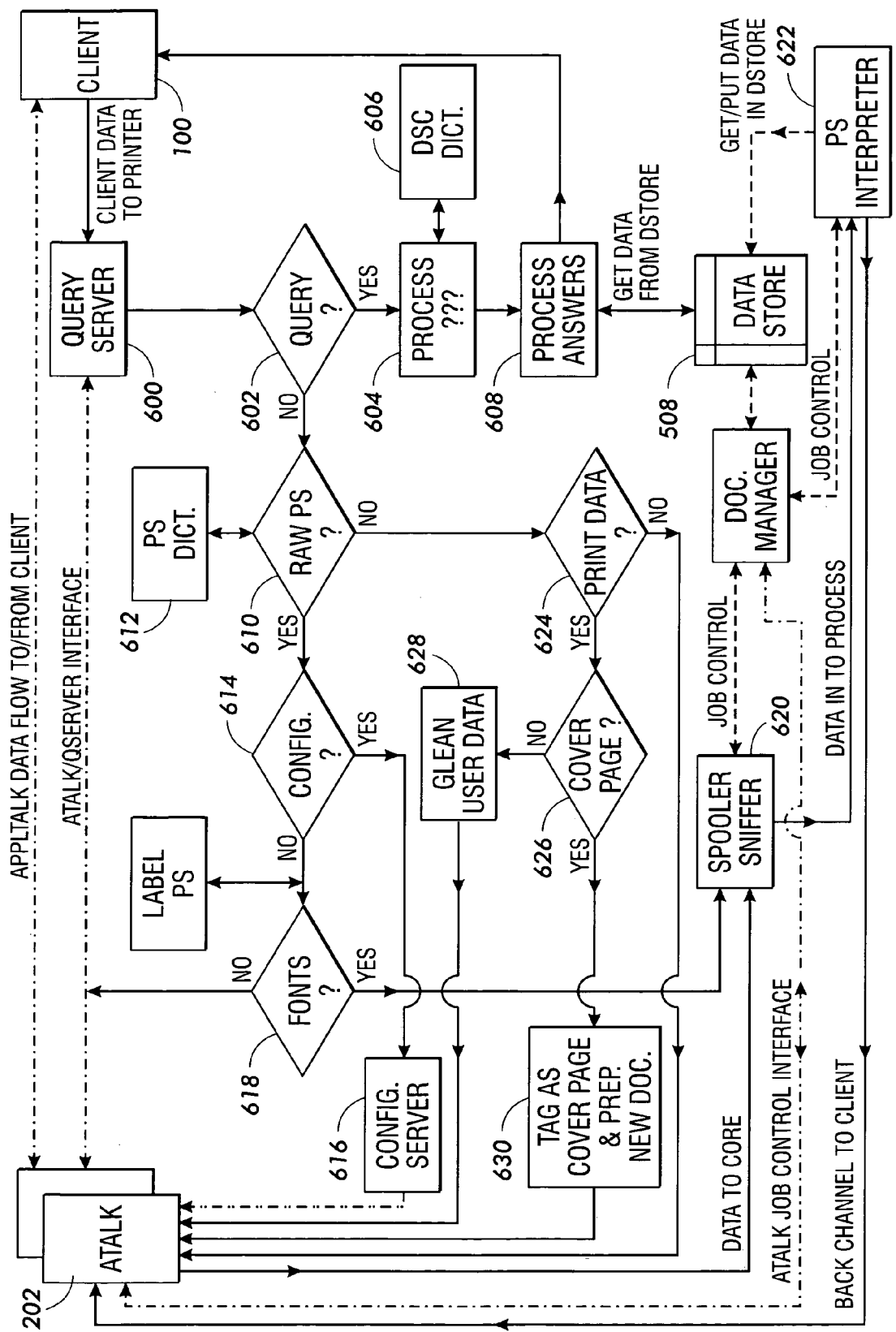
FIG. 6 is an exemplary flow chart illustrating another embodiment of the present invention.

A method of managing jobs for a print communication protocol module is also disclosed. Referring now to FIG. 6, the steps of the method are shown. Client data is sent by client 100, and received by a query server of the smart front end 104 before it reaches a print communication protocol module 202, such as AppleTalk by Apple Computer, step 600. Print queries are parsed from other client data by query parser, step 602. Next, any print queries that are found are processed, step 604. The processing includes accessing the query in a standard query processing language dictionary, such as a DSC dictionary, step 606. The query is then interpreted using the DSC dictionary 604 and the location of the answer to the query is obtained, step 608. Step 608 continues with retrieval of the answer from a data store 508, which is dynamically updated by the Postscript Interpreter 204. Step 608 also includes the sending the answer to the client 100.

If no query is found in step 602, raw page description language, such as Postscript by Adobe, Inc., is distinguished from other client data, step 610. This includes accessing a page description dictionary 512, such as a Postscript dictionary, step 612. If the data is raw Postscript, it is examined to determine if it is a configuration request, such as a Capture request, step 614. Other configuration requests may come in and are handled by smart front end 104, but Capture is provided for illustration purposes. Once a Capture request is identified, the network settings of the print device are configured as requested by the Capture request, step 616. More particularly, step 616 includes gleaning the Capture message, sending the configuration change request to the protocol communication module configuration server 516, and monitoring the status of the protocol communication module while it is reconfigured. Smart front end 104 waits for a response from the configuration server that the request is satisfied before restarting job processing. Because the smart front end 104 monitors the state of the protocol communication module 202 throughout the stages of disabling from the network, modifying the network settings of the module 202 to match the Capture request, and re-enabling the protocol communication module 202 on the network, interactivity with the print device job management software is not interrupted. As a result, with the smart front end, it is not necessary to reboot the entire printer device in the event of a network configuration change. Thus, any other system services on the print device are not affected by the change or the process that enables it, nor is the interpreter involved in aspects of the system that are not naturally associated with its functions.

If the raw Postscript data is not a Capture request, it is determined if the data includes a font download, step 618. The font download process is provided for illustration and example of the capability of smart front end 104. Any request, in any page description language, that is followed by a special job that requires the attention of a specific interpreter and a temporary realignment of job management with regard to spooling and multiple document streaming, could be handled in this way. Processing a font download includes determining the specification of an appropriate page description language interpreter 204, such as a Postscript interpreter, step 620, and configuring the accessibility of the job management control. Step 620 further includes disengaging the spooling module 520 which includes the standard heuristic "sniffer" 522 for selecting the correct interpreter. Then the job/document flow to the Interpreter can be re-configured and the correct (i.e., Postscript) interpreter as determined by the smart front end 104 directly specified. Once the Postscript interpreter 204 becomes available, it is engaged. A direct path for streaming multiple documents through the protocol module 202 is created between the AppleTalk module 202 and the Postscript interpreter 204 as described above. A back channel is opened between the interpreter 204 and the AppleTalk module 200, to carry data going out to the client, step 622. These settings override the standard settings for print device job management services which expedite the processing of standard print jobs. The standard settings and procedures are restored by the smart front end on completion of the [font download] process.

With continuing reference to FIG. 6, if it is decided that the client data is not raw Postscript, step 610, selected client data is routed to the print communication protocol module, while other selected client data is processed and the protocol module 202 is bypassed. More particularly, it is decided if the data is print data, step 624. Any data that is not print data, and not recognizable to the smart front end 104, is returned to the AppleTalk protocol module 202. It is then determined if any data that is print data is cover page data, step 626. If it is not, user data is gleaned from the Postscript Header and embedded in the print job context description, step 628. Step 628 also includes returning the stream of user network data to the AppleTalk protocol communication module. If the print data is cover page data, the print job document is tagged as a cover page and sent to the protocol communication module, step 630. Step 630 continues with the preparation of a new document for the actual primary print job data when data for a job tagged as having a cover page arrives. Step 630 also includes parsing the data stream as usual for user description data and then returning it to the protocol communication module in the job description context.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

What is claimed is:

1. In a document producing system including a client in data communication with a job-based print device through a print communication protocol module, an interface which processes client data comprising:

a query processor that intercepts client data directed to the print device from the client, detects a query in the intercepted client data, routes the query to be answered, and returns an answer to the query to the client, prior to the client data reaching the print communication protocol module;

a raw page description language data parser that receives non-query client data from the query parser, detects raw data and processes select raw data; and a font enabler that establishes an open channel to the print device bypassing the communication protocol module if the detected raw data includes a font download.

2. The document producing system of claim 1, wherein the interface further includes:

a query module that interprets the query routed from the query parser; and an answer module that locates an answer to the query and forward the answer to the client.

3. The document producing system of claim 1, wherein the interface further includes:

a spooling module that queues a plurality of client data for processing by one or more page description language interpreters.

4. The document producing system of claim 1, wherein the interface further includes:

a page description language dictionary that has portions of a page description language for reference by the raw data parser.

5. The document producing system of claim 1, wherein the interface further includes:

a job parser that detects print data in the client data and routes the print data to be examined for cover page data.

6. The document producing system of claim 5, wherein the interface further includes:

a cover page parser that examines print data for cover page data and routes the cover page and non-cover page data;

a user data module that gleans user data from print data that is not cover page data and returns the user data to the communication protocol module; and a cover page module that modifies job flow through the document producing system to introduce and handle a cover page document.

7. The document producing system of claim 1, wherein the interface further includes:

a configuration parser that detects and routes configuration requests in the client data.

8. The document producing system of claim 7, wherein the interface further includes:

a configuration server which reconfigures targeted network settings according to configuration requests.

9. A method of interfacing a client with a job-based print device, wherein the client is in data communication with the print device via a print communication protocol module, the method including the steps of:

intercepting client data directed to the print device from the client before the client data reaches the print communication protocol module;

examining the intercepted client data for a configuration request;

configuring the print communication protocol module on a print device targeted by the configuration request;

if no configuration request is present, determining if client data includes a font download; and processing the font download.

10. The method of interfacing a client with a job-based print device of claim 9, wherein the step of configuring the print communication protocol module includes:

identifying the configuration message;

sending the configuration request to a configuration server;

disabling the print protocol on a print device affected by the configuration message;

changing settings for a print protocol module on the print device to match a configuration requested by the configuration message;

enabling the print protocol module on the print device with the changed settings; and restarting job processing.

11. The method of interfacing a client with a job-based print device of claim 9, wherein the step of processing the font download includes:

disengaging a spooling module to reconfigure job data flow to a page description language interpreter;

engaging the page description language interpreter once it becomes available; and opening a back channel to the print communication protocol module.

12. The method of interfacing a client with a job-based print device of claim 9, wherein the method further includes:

parsing print queries from other client data; and processing the print queries.

13. The method of interfacing a client with a job-based print device of claim 12, wherein the step of processing print queries includes:

accessing the query in a standard query processing language dictionary;

interpreting the query with the standard query processing language dictionary;

obtaining the location of an answer to the query from the dictionary;

retrieving the answer from a data store; and sending the answer to the client.

14. The method of interfacing a client with a job-based print device of claim 9, wherein the method further includes:

deciding if the client data is print data;

determining if the print data is cover page data;

tagging a print job that has cover page data;

sending the cover page data to the print communication protocol module;

preparing a new document for primary job data following receipt of cover page data;

gleaning user data from incoming print data that is not cover page data;

placing user data that is not print data into a print job context description; and returning data flow to the print communication protocol module.

* * * * *